US012431626B2

(12) United States Patent
Zhang et al.

(10) Patent No.: US 12,431,626 B2
(45) Date of Patent: Sep. 30, 2025

(54) PLANAR INVERTED F ANTENNA PAIR AND ELECTRONIC DEVICE

(71) Applicants: Honor Device Co., Ltd., Shenzhen (CN); Tsinghua University, Beijing (CN)

(72) Inventors: Weiquan Zhang, Beijing (CN); Zhijun Zhang, Shenzhen (CN)

(73) Assignees: Honor Device Co., Ltd., Shenzhen (CN); Tsinghua University, Beijing (CN)

( * ) Notice: Subject to any disclaimer, the term of this patent is extended or adjusted under 35 U.S.C. 154(b) by 0 days.

(21) Appl. No.: 18/289,886

(22) PCT Filed: May 8, 2023

(86) PCT No.: PCT/CN2023/092721
§ 371 (c)(1),
(2) Date: Nov. 7, 2023

(87) PCT Pub. No.: WO2024/012026
PCT Pub. Date: Jan. 18, 2024

(65) Prior Publication Data
US 2025/0096469 A1 Mar. 20, 2025

(30) Foreign Application Priority Data
Jul. 13, 2022 (CN) ......................... 202210821490.6

(51) Int. Cl.
*H01Q 9/04* (2006.01)
*H01Q 1/48* (2006.01)
*H01Q 5/15* (2015.01)

(52) U.S. Cl.
CPC ............ *H01Q 9/0421* (2013.01); *H01Q 1/48* (2013.01); *H01Q 5/15* (2015.01)

(58) Field of Classification Search
CPC .. H01Q 1/36; H01Q 1/48; H01Q 1/50; H01Q 1/521; H01Q 1/523; H01Q 5/15;
(Continued)

(56) References Cited

U.S. PATENT DOCUMENTS 6,304,220 B1 10/2001 Herve et al.
7,154,441 B2 12/2006 Hansen et al.
(Continued)

FOREIGN PATENT DOCUMENTS

CN 101533950 A 9/2009
CN 101662070 A * 3/2010 ............... H01Q 9/04
(Continued)

OTHER PUBLICATIONS

Chu et al., "New Progresses of Cross-band Decoupling Techniques for Base Station Antennas," Safety and Electromagnetic Compatibility, No. 5, pp. 23-28 and 41 (2021).
(Continued)

*Primary Examiner* — Hoang V Nguyen
(74) *Attorney, Agent, or Firm* — Leydig, Voit & Mayer, Ltd.

(57) ABSTRACT

This application discloses a planar inverted F antenna pair and an electronic device, and relates to the field of antenna technologies. The planar inverted F antenna pair includes a dielectric substrate, a ground metal plane, and a radiation unit, where the ground metal plane is arranged on a side of the dielectric substrate, two ends of the radiation unit are respectively connected to a first feed portion and a second feed portion, the radiation unit is connected to the ground metal plane through a ground metal sheet, the ground metal sheet is located between the first feed portion and the second feed portion, distances from the first feed portion and the second feed portion to the ground metal sheet are not equal,
(Continued)

the ground metal plane is provided with a slot, and two ends of the slot are located on two sides of the ground metal sheet.

12 Claims, 14 Drawing Sheets

(58) Field of Classification Search
CPC .......... H01Q 5/35; H01Q 9/0421; H01Q 9/42; H01Q 21/0006; H01Q 21/28; H01Q 21/30
See application file for complete search history.

(56) References Cited

U.S. PATENT DOCUMENTS

| | | | |
|---|---|---|---|
| 10,211,533 | B2 | 2/2019 | Huang et al. |
| 2002/0140612 | A1 | 10/2002 | Kadambi et al. |
| 2013/0271325 | A1 | 10/2013 | Andrenko |
| 2019/0165468 | A1 | 5/2019 | Xu et al. |
| 2023/0163457 | A1 | 5/2023 | Tsai et al. |

FOREIGN PATENT DOCUMENTS

| | | | |
|---|---|---|---|
| CN | 101807745 | A | 8/2010 |
| CN | 103326116 | A | 9/2013 |
| CN | 104852122 | A | 8/2015 |
| CN | 105896033 | A | 8/2016 |
| CN | 106972236 | A | 7/2017 |
| CN | 206506025 | U | 9/2017 |
| CN | 107346842 | A | 11/2017 |
| CN | 208522080 | U | 2/2019 |
| CN | 108470979 | B | 4/2020 |
| CN | 210296619 | U | 4/2020 |
| CN | 110649386 | B | 1/2021 |
| CN | 113517557 | A | 10/2021 |
| CN | 113540787 | A | 10/2021 |
| CN | 113871873 | A | 12/2021 |
| CN | 114069218 | A | 2/2022 |
| CN | 216958508 | U | 7/2022 |
| CN | 114976602 | A | 8/2022 |
| DE | 10244206 | A1 | 3/2004 |

OTHER PUBLICATIONS

Sun et al., "Antenna Decoupling by Common and Differential Modes Cancellation," IEEE Transactions on Antennas and Propagation, vol. 69, No. 2, pp. 672-682 (Feb. 2021).

Hu et al. "Compact Co-Polarized PIFAs for Full-Duplex Application Based on CM/DM Cancellation Theory," IEEE Transactions on Antennas and Propagation, vol. 69, No. 11, pp. 7103-7110 (Nov. 2021).

Zhang et al. "A Two-Port Microstrip Antenna With High Isolation for Wi-Fi 6 and Wi-Fi 6E Applications," IEEE Transactions on Antennas and Propagation, IEEE, USA, vol. 70, No. 7, pp. 5227-5234 (Jul. 2022).

Hu et al. "Compact Co-Polarized PIFAs for Full-Duplex Application Based on CM/DM Cancellation Theory," IEEE Transactions on Antennas and Propagation, IEEE, USA, vol. 69, No. 11, pp. 7103-7110 (Nov. 2021).

Ji et al. "Low Mutual Coupling Design for 5G MIMO Antennas Using Multi-Feed Technology and Its Application on Metal-Rimmed Mobile Phones," IEEE Access, IEEE, USA, vol. 9, pp. 151023-151036 (Nov. 15, 2021).

Rafik et al. "Dual-Band WLAN Multi-Antenna System with High Isolation," Antennas and Propagation (EUCAP), Proceedings of the 5th European Conference on, IEEE, pp. 2478-2482 (Apr. 11, 2011).

* cited by examiner

PLANAR INVERTED F ANTENNA PAIR AND ELECTRONIC DEVICE

CROSS-REFERENCE TO RELATED APPLICATIONS

This application is a National Stage of International Application No. PCT/CN2023/092721, filed on May 8, 2023, which claims priority to Chinese Patent Application No. 202210821490.6, filed on Jul. 13, 2022, both of which are incorporated by reference in their entireties.

TECHNICAL FIELD

This application relates to the field of antenna technologies, and in particular, to a planar inverted F antenna pair and an electronic device.

BACKGROUND

Wireless communication technologies play an important role in life and technology. However, with the application of various wireless technologies, spectrum resources are no longer surplus. Like many technologies, the Wi-Fi technology has been constantly improved and evolved to meet the growing demand for wireless communication. In 2020, the IEEE 802.11ax wireless standard was renamed Wi-Fi 6E. Due to use of the 6G frequency band, Wi-Fi 6E has advantages such as wider bandwidth, high concurrency, and low latency compared with Wi-Fi 6 in the 5G frequency band. In consideration of user aesthetics and actual production, antenna systems working on different wireless standards are often integrated.

In the prior art, as shown in FIG. 1, two compactly placed antenna systems 1 and 2 support the Wi-Fi 6 standard and the Wi-Fi 6E standard respectively. Because the gap between the two wireless standard working frequency bands is only 0.09 GHz, serious signal interference will occur between the two compactly placed antenna systems. Therefore, how to realize decoupling between antennas has become an urgent problem to be resolved.

SUMMARY

This application provides a planar inverted F antenna pair and an electronic device. The planar inverted F antenna pair has a compact structure, and broadband decoupling between the antennas can be realized through a simple structure without addition of a complex decoupling structure and an optimization process or introduction of additional loss.

To achieve the foregoing objective, the following technical solutions are used in embodiments of this application:

According to a first aspect, this application provides a planar inverted F antenna pair, including: a dielectric substrate, a ground metal plane, and a radiation unit, where the ground metal plane is arranged on a side of the dielectric substrate, two ends of the radiation unit are respectively connected to a first feed portion and a second feed portion, the radiation unit is connected to the ground metal plane through a ground metal sheet, the ground metal sheet is located between the first feed portion and the second feed portion, distances from the first feed portion and the second feed portion to the ground metal sheet are not equal, the ground metal plane is provided with a slot, and two ends of the slot are located on two sides of the ground metal sheet.

On this basis, by arranging the ground metal sheet to connect the radiation unit and the ground metal plane, and arranging the first feed portion and the second feed portion at the two ends of the radiation unit, two back-to-back planar inverted F antennas are formed; by setting distances from the first feed portion and the second feed portion to the ground metal sheet to be not equal, an asymmetric planar inverted F antenna pair is formed, so that the two antennas can work within different working frequency bands; and by providing the slot on the ground metal plane, and providing the two ends of the slot to be located on the two sides of the ground metal sheet, the two inverted F antennas can be both coupled with the slot to excite the slot, and by designing an appropriate slot size, broadband decoupling of the two antennas is realized.

In a possible design manner of the first aspect, the ground metal plane is provided with two slots, the two slots are symmetrically arranged on two sides of the radiation unit, and the first feed portion and the second feed portion are located between the two slots.

On this basis, by providing slots on both of the two sides of the radiation unit, the slots can realize broadband decoupling of the two antennas, and the two slots have the same working principle. The two slots are symmetrically provided on the radiation unit, and the symmetrical structure makes the decoupling effect of the two slots better.

In a possible design manner of the first aspect, both the first feed portion and the second feed portion are located on a center line of the radiation unit.

On this basis, this design manner makes the inverted F antenna pair symmetrical with respect to a connection line between the center of the first feed portion and the center of the second feed portion, so that the antenna structure is more compact, the design is convenient, and it is beneficial to realizing the decoupling of the two antennas through the slots.

In a possible design manner of the first aspect, a working frequency band of one inverted F antenna is from 5.15 GHz to 5.835 GHz, and a working frequency band of the other inverted F antenna is from 5.925 GHz to 7.125 GHz.

In a possible design manner of the first aspect, the ground metal plane and the radiation unit are rectangular, and the slot is also rectangular. On this basis, these structures on the antennas are all designed as regular rectangles, which is convenient for design, so as to realize decoupling of the two antennas.

In a possible design manner of the first aspect, a length of the ground metal plane is 65 mm, a width of the ground metal plane is 30 mm, a length of the slot is 22 mm to 26 mm, and a width of the slot is 2 mm.

According to a second aspect, this application provides an electronic device, including a body and the planar inverted F antenna pair according to the first aspect and any possible design manner thereof, where the planar inverted F antenna pair is arranged inside the body.

It can be understood that, for beneficial effects that can be achieved by the electronic device described in the second aspect provided above, reference may be made to beneficial effects in the first aspect and any possible design manner thereof, and details are not described herein again.

DESCRIPTION OF EMBODIMENTS

Figure 1:
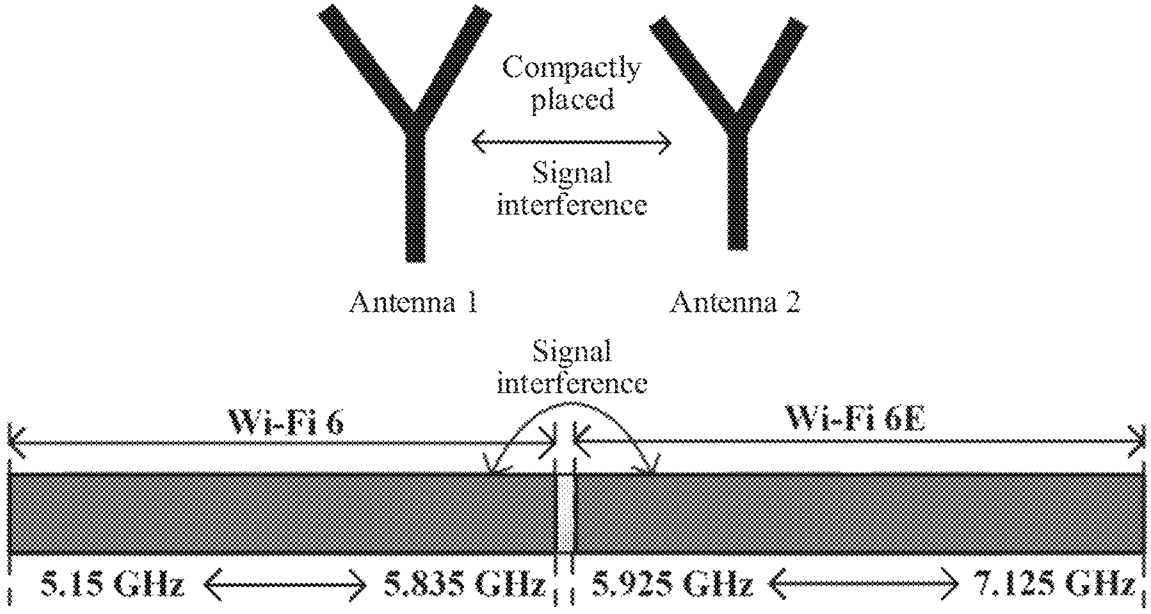
FIG. 1 is a schematic diagram of a dual-antenna system in the prior art.

The following describes technical solutions in this application with reference to accompanying drawings.

In the embodiments of this application, words such as "exemplary" or "for example" are used for representing giving an example, an illustration, or a description. Any embodiment or design scheme described as "exemplary" or "for example" in the embodiments of this application should not be explained as being more preferable or having more advantages than other embodiments or design schemes. Exactly, the terms such as "exemplary" or "for example" are intended to present related concepts in a specific manner.

In the embodiments of this application, the terms such as "first" and "second" are used only for the purpose of description, and should not be understood as indicating or implying the relative importance or implicitly specifying the quantity of indicated technical features. Therefore, a feature limited by "first" or "second" may explicitly or implicitly include one or more of the features.

It should be understood that, terms used in description of the various examples in this specification are merely for describing specific examples and are not intended to impose limitations. As used in the descriptions of the various examples, singular forms "one" ("a" or "an") and "the" are intended to include plural forms as well, unless otherwise explicitly indicated in the context.

In this application, "at least one" indicates one or more and "a plurality of" indicates two or more. "At least one of the following" or a similar expression thereof indicates any combination of these items, including a single item or any combination of a plurality of items. For example, at least one of a, b, or c may represent a, b, c, "a-b", "a-c", "b-c", or "a-b-c", where a, b, and c may be singular or plural.

It should also be understood that the term "and/or" used in this specification refers to and includes any and all possible combinations of one or more of the associated listed items. The term "and/or" describes an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

It should be further understood that in this application, unless otherwise specified and defined explicitly, the term "connect" should be understood in its general sense. For example, "connect" may refer to a fixed connection, a sliding connection, a detachable connection, or an integrated connection; and may be a direct connection, or an indirect connection through an intermediate medium.

It should also be understood that, the terms "include" (also referred to as "includes", "including", "comprises" and/or "comprising"), when used in this specification, specify the presence of stated features, integers, steps, operations, elements, and/or components, but do not preclude the presence or addition of one or more other features, integers, steps, operations, elements, components, and/or groups thereof.

It should be understood that "an embodiment", "another embodiment", or "a possible design manner" mentioned throughout the specification means that particular features, structures, or characteristics related to the embodiments or the implementations are included in at least one embodiment of this application. Therefore, "in an embodiment of this application", "in another embodiment of this application", or "in a possible design manner" occurs in everywhere throughout the specification may not necessarily refer to the same embodiment. In addition, these specific features, structures, or characteristics may be combined in one or more embodiments in any appropriate manner.

To facilitate understanding of technical solutions in this application, the technical background related to the technical solutions in this application are first described before writing of the embodiments of this application.

FIG. 1 is a schematic diagram of a dual-antenna system in the prior art. As shown in FIG. 1, the compact dual-antenna in the prior art includes an antenna 1 and an antenna 2, where the antenna 1 and the antenna 2 respectively support the Wi-Fi 6 standard (5.15 GHz to 5.835 GHz) and the Wi-Fi 6E (5.925 GHz to 7.125 GHz) standard. However, because the gap between the working frequency bands of the Wi-Fi 6 standard and the Wi-Fi 6E standard is only 0.09 GHz, serious signal interference will occur between the two compactly placed antennas 1 and 2. In addition, how to respectively implement two antennas with a certain bandwidth in a compact size is also a technical difficulty.

In order to resolve the problem of serious signal interference between the two antennas when the existing compact dual-antenna supports both the Wi-Fi 6 standard and the Wi-Fi 6E standard, embodiments of this application provide a planar inverted F antenna pair and an electronic device, which can work in continuous frequency bands and have broadband high-isolation characteristics, and support both the Wi-Fi 6 standard and the Wi-Fi 6E; and the antenna system has a compact structure.

Figure 2:
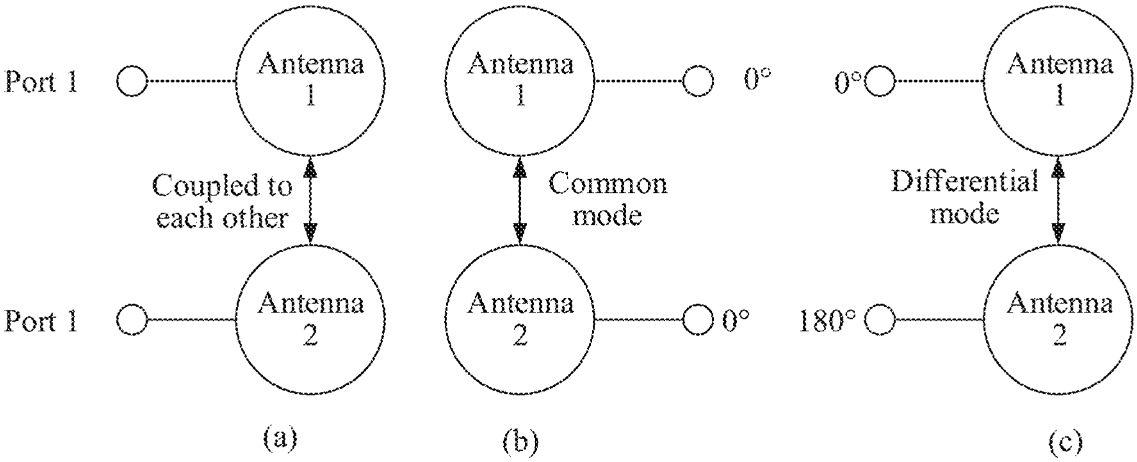
FIG. 2 is a schematic diagram of mutual coupling between antennas according to an embodiment of this application.

To facilitate understanding of the technical solutions in the embodiments of this application, some decoupling technologies and principles involved in the technical solutions of this application are described below;

FIG. 2 is a schematic diagram of mutual coupling between antennas according to an embodiment of this application. As shown in (a) of FIG. 2, there is a certain distance between the antenna 1 and the antenna 2, where the antenna 1 is connected to a port 1, the antenna 2 is connected to a port 2, and the antenna 1 and the antenna 2 are coupled to each other. As shown in (b) of FIG. 2, when an excitation signal is inputted at the port 1, an excitation signal is also inputted at the port 2. The two excitation signals have the same magnitude and the same polarity. In this case, the antenna 1 and the antenna 2 are in a common mode. As shown in (c) of FIG. 2, when the excitation signal inputted at the port 1 and the excitation signal inputted at the port 2 are adjusted to have the same magnitude, but have opposite polarities, in this case, the antenna 1 and the antenna 2 are in a differential mode. Because the impedances corresponding to the antennas are not equal or not similar (unbalanced) within the corresponding frequency bands in the common mode and the differential mode, there is coupling between the two antennas.

Figure 3:
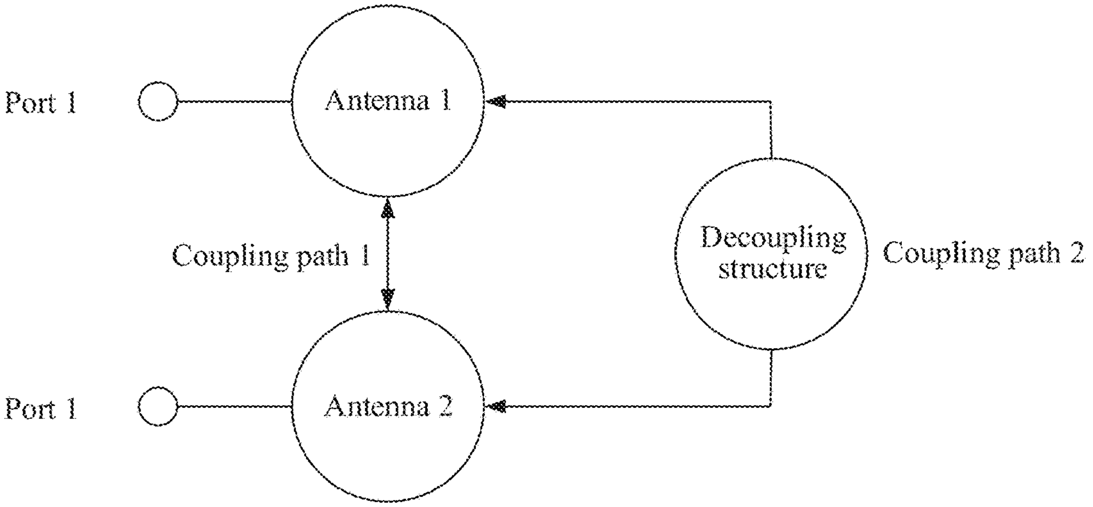
FIG. 3 is a schematic diagram of a decoupling principle of antennas according to an embodiment of this application.

A decoupling principle of the antennas shown in FIG. 2 is described below. FIG. 3 is a schematic diagram of a decoupling principle of antennas according to an embodiment of this application. As shown in FIG. 3, a decoupling structure is added between the antenna 1 and the antenna 2, a path of direct coupling between the antenna 1 and the antenna 2 is referred to as a coupling path 1, and coupling between the antenna 1 and the antenna 2 formed by the added decoupling structure is referred to as a coupling path 2. By loading the decoupling structure between the two antennas and introducing the coupling path 2, parameters of the decoupling structure can be adjusted, so that when the coupling formed by the introduced coupling path 2 and the coupling formed by the coupling path 1 of the two antennas in the antenna system offset each other, the decoupling between the antenna ports can be realized. In an ideal case, when the impedance ($S_{CM}$) of the antenna 1 and the antenna 2 in the common mode and the impedance ($S_{DM}$) thereof in the differential mode are equal at a frequency point $f_0$, that is, when $S_{CM}=S_{DM}$, the degree of isolation between the two ports can reach infinity at the frequency point $f_0$. From the perspective of the common mode or the differential mode, a decoupling structure is added between the antenna 1 and the antenna 2, and loading of the decoupling structure will have influence on both the impedance of the antennas in the common mode and the impedance of the antennas in the differential mode. Therefore, if influence can be caused to the impedance of the antennas in only one of the modes by loading the decoupling structure, independent adjustment of the antenna decoupling process can be realized.

Figure 4:
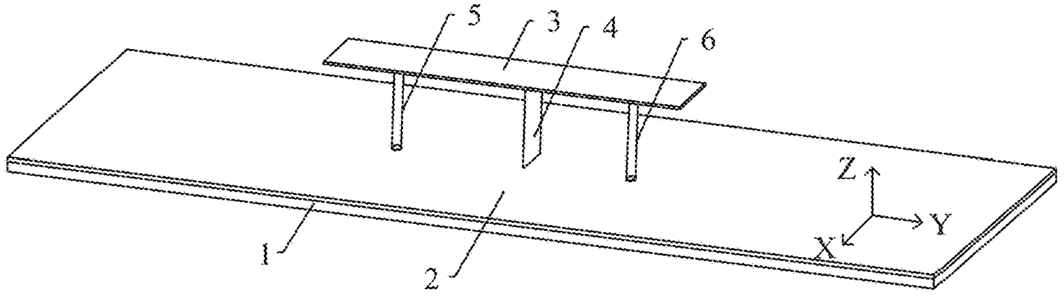
FIG. 4 is a schematic structural diagram of a planar inverted F antenna pair according to an embodiment of this application.

FIG. 4 is a schematic structural diagram of a planar inverted F antenna pair according to an embodiment of this application. As shown in FIG. 4, the planar inverted F antenna pair includes a dielectric substrate 1, a ground metal plane 2, a radiation unit 3, and a connection structure. In this embodiment, the radiation unit 3 is a metal sheet. The ground metal plane 2 is arranged on a side of the dielectric substrate 1, and the metal sheet is connected to the ground metal plane 2 and the dielectric substrate 1 through the connection structure. The connection structure includes a ground metal sheet 4 and metal connection columns. One end of the ground metal sheet 4 is connected to the metal sheet, and the other end thereof is connected to the ground metal plane 2. Each of two ends of the metal sheet is provided with a metal connection column. One end of the metal connection column is connected to the metal sheet, the other end of the metal connection column passes through the ground metal plane 2 to be connected to the dielectric substrate 1, and a certain gap is kept between the metal connection column and the ground metal plane 2. The two metal connection columns respectively form a first feed portion 5 and a second feed portion 6, and the end of the metal connection column connected to the dielectric substrate 1 may be connected to a feed through a microstrip line to realize excitation for the antennas.

In this embodiment of this application, a ground metal sheet 4 is arranged in the middle of the metal sheet, and each of the two ends of the metal sheet is provided with a metal connection column; and input of an excitation signal is realized through the metal connection column and the microstrip line. The two metal connection columns are equivalent to two ports of the antennas, so that the metal sheet, the ground metal sheet 4, the metal connection columns, the ground metal plane 2, and the dielectric substrate 1 form an inverted F antenna pair. The ground metal sheet 4, the metal sheet on one side of the ground metal sheet 4, and the metal connection column may be understood as an inverted F antenna, and the ground metal sheet 4, the metal sheet on the other side of the ground metal sheet 4, and the metal connection column may be understood as the other inverted F antenna.

In this embodiment of this application, because the inverted F antenna pair needs to support the Wi-Fi 6 standard and the Wi-Fi 6E standard, the two antennas are set as antennas of different specifications. As shown in FIG. 4, for ease of description, the metal connection column on the left side of the ground metal sheet 4 is referred to as a first metal connection column, and the metal connection column on the right side of the ground metal sheet 4 is referred to as a second metal connection column.

Figure 5:
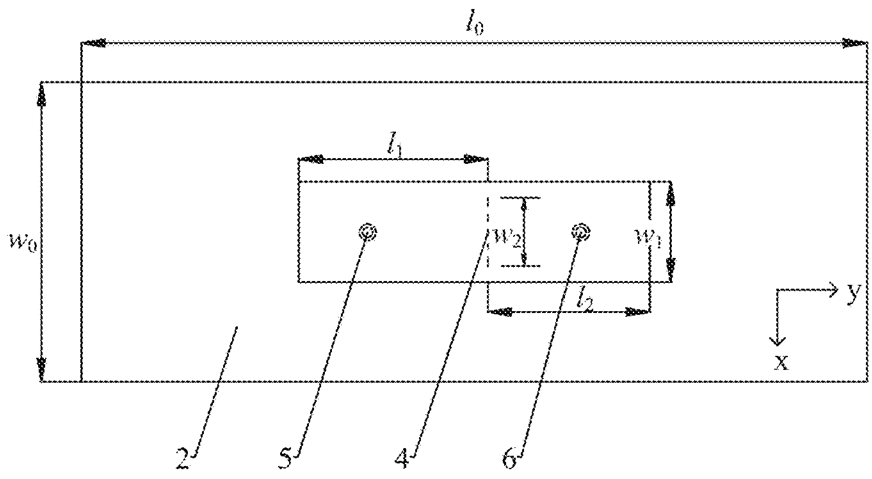
FIG. 5 is a schematic top view of the planar inverted F antenna pair shown in FIG. 4.

FIG. 5 is a schematic top view of the planar inverted F antenna pair shown in FIG. 4, which is a projection of the planar inverted F antenna pair on an xy plane. As shown in FIG. 5, the length of the ground metal plane 2 is $l_0$, and the width of the ground metal plane 2 is $w_0$. With the ground metal sheet 4 as a boundary, the length of the metal sheet on the left side of the ground metal sheet 4 is a first length $l_1$, the length of the metal sheet on the right side of the ground metal sheet 4 is a second length $l_2$, the width of the metal sheet is a first width $w_1$, and the width of the ground metal sheet 4 is a second width $w_2$.

Figure 6:
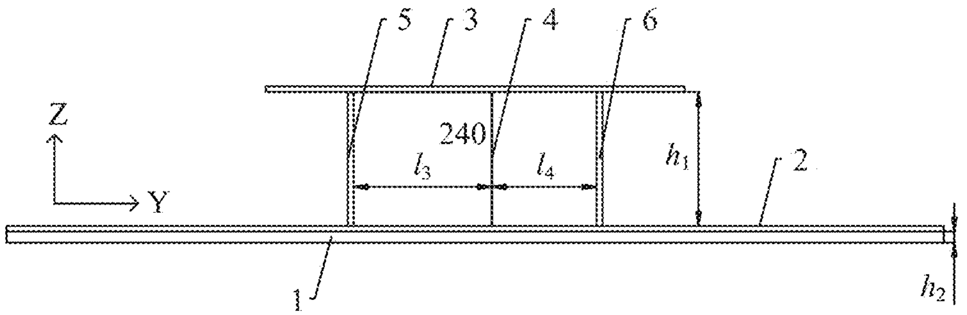
FIG. 6 is a schematic front view of the planar inverted F antenna pair shown in FIG. 4.

FIG. 6 is a schematic front view of the planar inverted F antenna pair shown in FIG. 4, which is a projection of the planar inverted F antenna pair on a yz plane. As shown in FIG. 6, the height between the metal sheet and the ground metal plane 2 is $h_1$, and the height of the dielectric substrate 1 is $h_2$. A distance between the ground metal sheet 4 and the first metal connection column is $l_3$, and a distance between the ground metal sheet 4 and the second metal connection column is $l_4$.

By setting the distances from the ground metal sheet 4 to the first metal connection column and to the second metal connection column to be not equal, the two planar inverted F antennas have different lengths, so that the two antennas can work in different frequency bands. The planar inverted F antenna pair has symmetry within the YZ plane.

In order to acquire the radiation performance of the antenna shown in FIG. 4, electric field intensity simulation is performed on the antenna pair shown in FIG. 4. In this embodiment of this application, during simulation, size parameters of the antenna pair shown in FIG. 4 may be set with reference to the following data: $l_0$=65 mm, $l_1$=14 mm, $l_2$=11 mm, $l_3$=9.5 mm, $l_4$=7 mm, $w_0$=30 mm, $w_1$=7 mm, $w_2$=4 mm, $h_1$=6 mm, $h_2$=0.6 mm. Electric field intensities of the antenna pair shown in FIG. 4 in the common mode and the differential mode at 6 GHz are simulated respectively.

Figure 7:
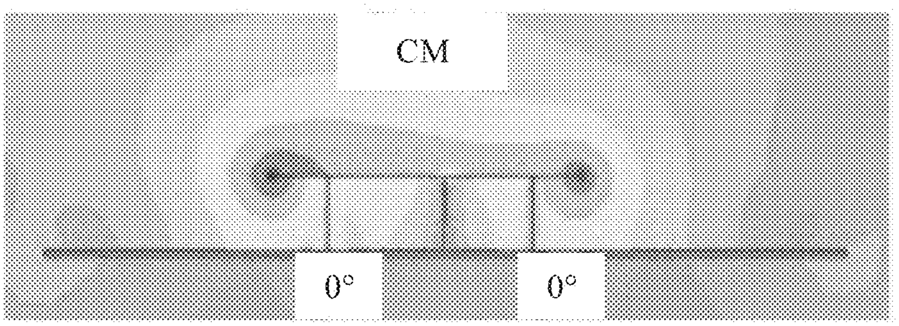
FIG. 7 is a simulated electric field intensity distribution diagram of the antenna pair shown in FIG. 4 in a common mode at 6 GHz.
Figure 8:
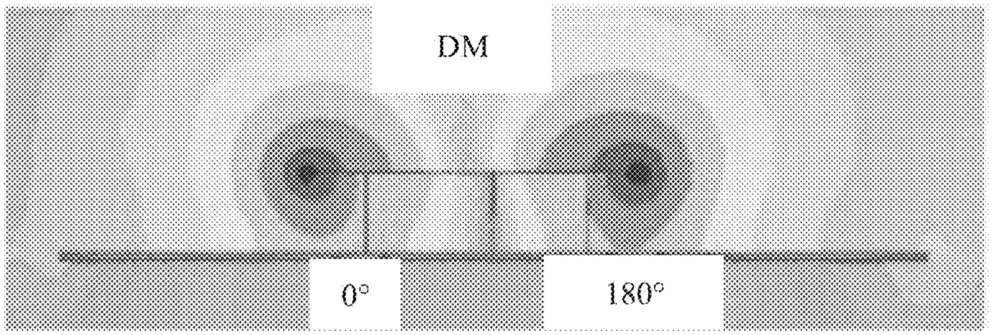
FIG. 8 is a simulated electric field intensity distribution diagram of the antenna pair shown in FIG. 4 in a differential mode at 6 GHz.

FIG. 7 is a simulated electric field intensity distribution diagram of the antenna pair shown in FIG. 4 in a common mode at 6 GHz; and FIG. 8 is a simulated electric field intensity distribution diagram of the antenna pair shown in FIG. 4 in a differential mode at 6 GHz. As shown in FIG. 7, the simulated electric field intensity distribution of the antenna pair shown in FIG. 4 in the common mode is relatively even, and a difference between the electric field intensity of accessories at two ends of the metal sheet and the electric field intensity in the middle of the metal sheet is relatively small. As shown in FIG. 8, the simulated electric field intensity distribution of the antenna pair shown in FIG. 4 in the differential mode has a relatively large difference. The electric field intensity of the accessories at the two ends of the metal sheet is relatively high, while the electric field intensity in the middle of the metal sheet is relatively low. There is a relatively large difference between the electric field intensity of the accessories at the two ends of the metal sheet and the electric field intensity in the middle of the metal sheet. It can be seen from the simulated electric field intensity distribution diagrams shown in FIG. 7 and FIG. 8 that the antenna pair shown in FIG. 4 has completely different electric field intensity distributions in the common mode and the differential mode, causing differences in working frequency bands and radiation performance of the antenna pair in the two modes (the common mode and the differential mode).

Figure 9:
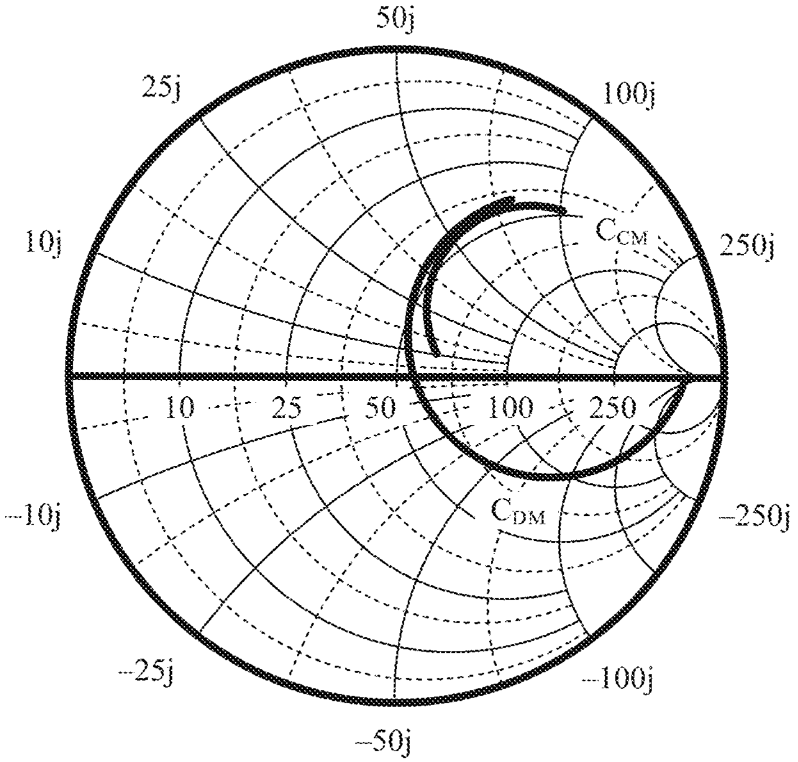
FIG. 9 is a Smith chart of impedances of the antenna pair shown in FIG. 4 in a common mode and a differential mode within 5 to 7.5 GHz.

In order to further analyze the performance difference of the antenna pair shown in FIG. 4 between the common mode and the differential mode, analysis and tests are further performed on other performance parameters of the antenna pair shown in FIG. 4 within 5 to 7.5 GHz in this application. FIG. 9 is a Smith chart of impedances of the antenna pair shown in FIG. 4 in a common mode and a differential mode within 5 to 7.5 GHz. As shown in FIG. 9, the curve $C_{CM}$ in the figure represents the impedance of the antenna pair in the common mode, and the curve $C_{DM}$ in the figure represents the impedance of the antenna pair in the differential mode. By comparing the curve $C_{CM}$ and the curve $C_{DM}$, it can be seen that the impedance of the antenna pair shown in FIG. 4 in the common mode is quite different from the impedance thereof in the differential mode, which indicates that there is coupling between the two antennas of the antenna pair.

Figure 10:
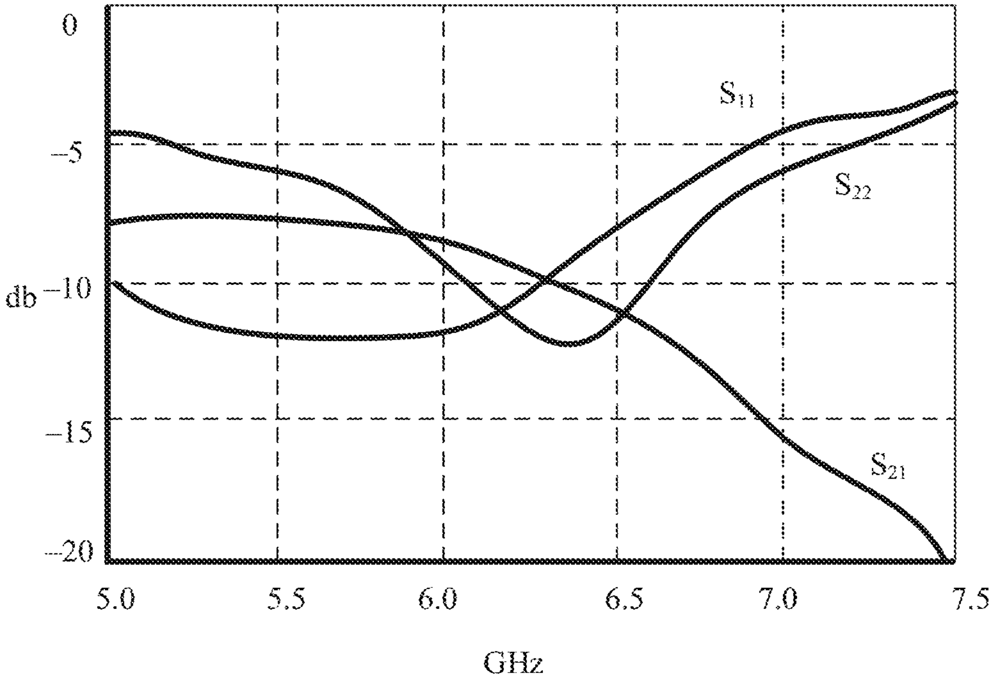
FIG. 10 is a simulated S parameter curve diagram of the antenna pair shown in FIG. 4 within 5 to 7.5 GHz.

FIG. 10 is a simulated S parameter curve diagram of the antenna pair shown in FIG. 4 within 5 to 7.5 GHz. As shown in FIG. 10, it can be seen from the curve S21 in the figure that within 5 to 6.5 GHz, the coupling degree of the two ports is relatively low, and its coupling degree is basically higher than −10 dB; and the coupling degree of the two ports near 6 GHz is higher than −9 dB.

Figure 11:
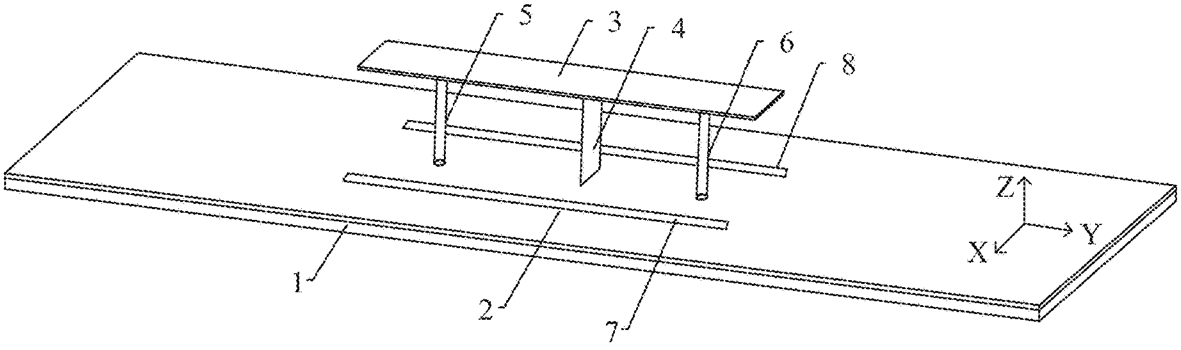
FIG. 11 is a schematic structural diagram of another planar inverted F antenna pair according to an embodiment of this application.

In order to resolve the problem of relatively high coupling degree between the antennas in the antenna pair shown in FIG. 4, an embodiment of this application further provides another planar inverted F antenna pair. FIG. 11 is a schematic structural diagram of another planar inverted F antenna pair according to an embodiment of this application. As shown in FIG. 11, the inverted F antenna pair in this embodiment of this application includes a dielectric substrate 1, a ground metal plane 2, a radiation unit 3, a ground metal sheet 4, and metal connection columns. In this embodiment, the radiation unit 3 being a metal sheet is used as an example. The ground metal plane 2 is arranged on a side of the dielectric substrate 1, and the radiation unit 3 (metal sheet) is connected to the ground metal plane 2 through the ground metal sheet 4. Each of two ends of the radiation unit 3 (metal sheet) is provided with a metal connection column (feed portion). One end of the metal connection column is connected to the metal sheet, the other end of the metal connection column passes through the ground metal plane 2 to be connected to the dielectric substrate 1, and a certain gap is kept between the metal connection column and the ground metal plane 2, that is, the metal connection column is not in direct contact with the ground metal plane 2. The end of the metal connection column connected to the dielectric substrate 1 may be connected to a feed through a microstrip line to realize excitation for the antennas. The metal connection columns at the two ends of the radiation unit 3 respectively form a first feed portion 5 and a second feed portion 6, and the ground metal sheet 4 is located between the first feed portion 5 and the second feed portion 6, that is, located between the two metal connection columns.

The ground metal plane 2 is provided with a slot, and the slot is located on one side of the radiation unit 3, or each of two sides of the radiation unit 3 is provided with a slot, and two ends of the slot are located on two sides of the ground metal sheet 3. As shown in FIG. 11, a first slot 7 and a second slot 8 are respectively provided on the two sides of the radiation unit 3. When each of the two sides of the radiation unit 3 is provided with a slot, the two slots may be symmetrically provided on the two sides of the radiation unit 3, that is, the first slot 7 and the second slot 8 are symmetrical with respect to the YZ plane in FIG. 11. The two slots are symmetrically provided on the two sides of the radiation unit 3, which can make the decoupling effect of the two slots better.

In this embodiment of this application, because the inverted F antenna pair needs to support the Wi-Fi 6 standard and the Wi-Fi 6E standard, the two antennas are set as antennas of different specifications. As shown in FIG. 11, for ease of description, the metal connection column on the left side of the ground metal sheet 4 is referred to as a first metal connection column (first feed portion 5), and the metal connection column on the right side of the ground metal sheet 4 is referred to as a second metal connection column (second feed portion 6).

Figure 12:
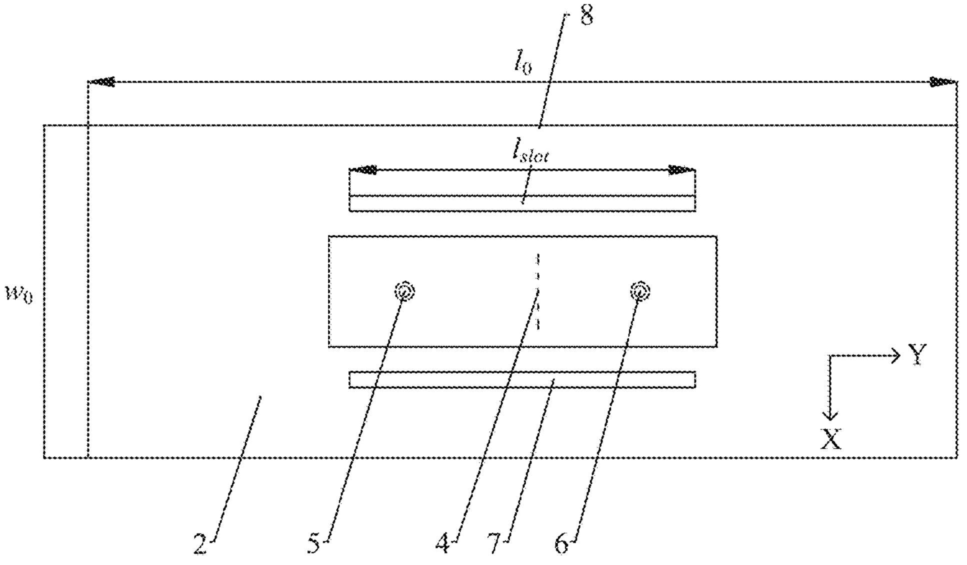
FIG. 12 is a schematic top view of the planar inverted F antenna pair shown in FIG. 11.

FIG. 12 is a schematic top view of the planar inverted F antenna pair shown in FIG. 11, which is a projection of the planar inverted F antenna pair on an xy plane. As shown in FIG. 12, the length of the ground metal plane 2 is $l_0$, and the width of the ground metal plane 2 is $w_0$. With the ground metal sheet 4 as a boundary, the length of the metal sheet on the left side of the ground metal sheet 4 is a first length $l_1$, the length of the metal sheet on the right side of the ground metal sheet 4 is a second length $l_2$, the width of the metal sheet is a first width $w_1$, and the width of the ground metal sheet 4 is a second width $w_2$. A distance between the slot and the metal sheet is d, a distance from a first end of the slot to a first end of the metal sheet is $d_1$, and a distance from a second end of the slot to a second end of the metal sheet is also $d_1$. Size parameters of this part of the antenna pair may be set with reference to the size parameters of the antenna pair shown in FIG. 4 above, d may be 2 mm, and $d_1$ may be 0.5 mm.

Figure 13:
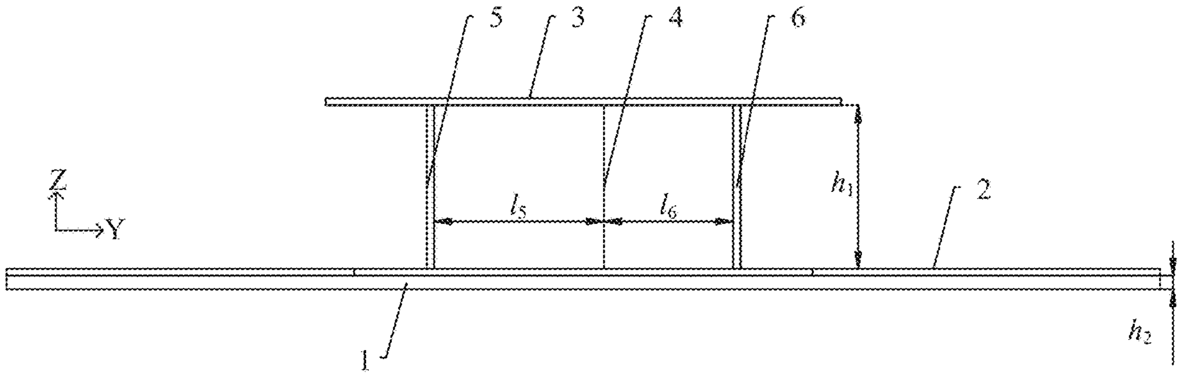
FIG. 13 is a schematic front view of the planar inverted F antenna pair shown in FIG. 11.

FIG. 13 is a schematic front view of the planar inverted F antenna pair shown in FIG. 11, which is a projection of the planar inverted F antenna pair on a yz plane. As shown in FIG. 13, the height between the metal sheet and the ground metal plane 2 is $h_1$, and the height of the ground metal plane 2 is $h_2$. A distance between the ground metal sheet 4 and the first metal connection column is $l_5$, and a distance between the ground metal sheet 4 and the second metal connection column is $l_6$.

Figure 14:
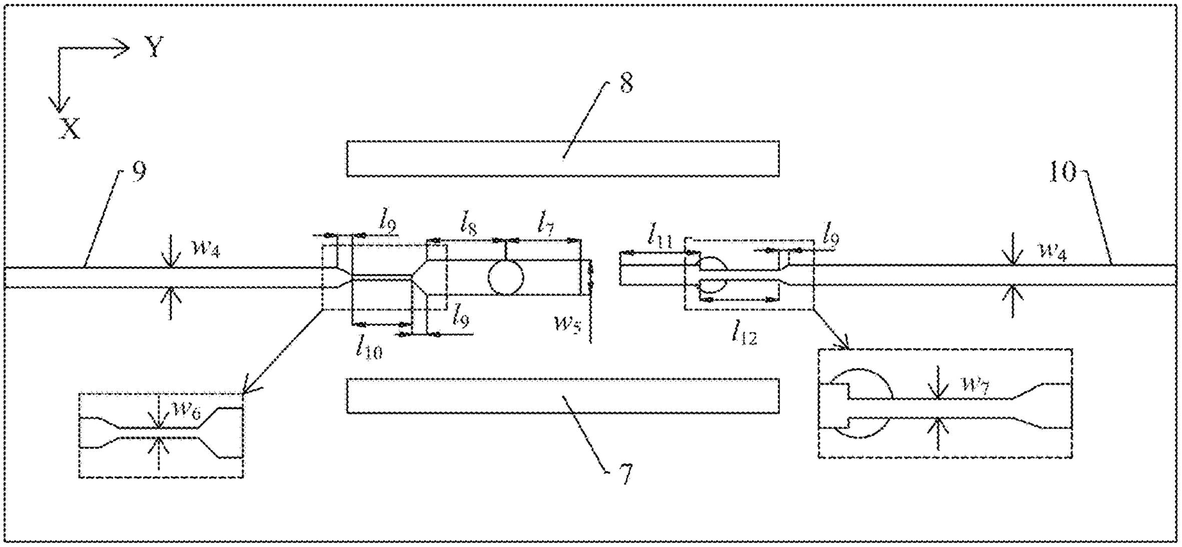
FIG. 14 is a schematic bottom view of the planar inverted F antenna pair shown in FIG. 11.

Both the two planar inverted F antennas can realize excitation and matching of the antennas through probes and microstrip lines. FIG. 14 is a schematic bottom view of the planar inverted F antenna pair shown in FIG. 11. As shown in FIG. 14, the end of the first metal connection column connected to the dielectric substrate 1 is connected to a first microstrip line, the end of the second metal connection column connected to the dielectric substrate 1 is connected to a second microstrip line, the other end of the first microstrip line is connected to a first port, and the other end of the second microstrip line is connected to a second port.

The structures of the first microstrip line and the second microstrip line are shown in FIG. 14, where the first microstrip line is formed by three sections of lines with different lengths and widths and connection portions. Specifically, the first microstrip line includes a first section of line, a first connection portion, a second section of line, a second connection portion, and a third section of line. The first connection portion connects the first section of line and the second section of line, and the second connection portion connects the second section of line and the third section of line. The first metal connection column and the first section of line are connected to each other, and are perpendicular to each other. Both the first connection portion and the second connection portion are trapezoidal. A distance from a first end of the first section of line to a center line of the first metal connection column is $l_7$, a distance from a second end of the first section of line to the center line of the first metal connection column is $l_8$, the width of the first section of line is $w_5$, the length of the first connection portion is $l_9$, the length of the second section of line is $l_{10}$, the width of the second section of line is $w_6$, the length of the second connection portion is $l_9$, and the width of the third section of line is $w_4$.

The second microstrip line is also formed by three sections of lines with different lengths and widths and connection portions. Specifically, the second microstrip line includes a fourth section of line, a fifth section of line, a third connection portion, and a sixth section of line. The fourth section of line is connected to the fifth section of line. The third connection portion connects the fifth section of line and the sixth section of line. When connected to the second microstrip line, the first metal connection column is connected to the connection position between the fourth section of line and the fifth section of line; and the first metal connection column and the second microstrip line are perpendicular to each other. The third connection portion is trapezoidal. The length of the fourth section of line is $l_{11}$, the length of the fifth section of line is $l_{12}$, the width of the fifth section of line is $w_7$, the length of the third connection portion is $l_9$, and the widths of the fourth section of line and the sixth section of line are both $w_4$.

For size parameters of the antenna pair shown in FIG. 11, refer to the following: $l_5$=5 mm, $l_6$=6 mm, $l_7$=4 mm, $l_8$=4 mm, $l_9$=1 mm, $l_{10}$=3 mm, $l_{11}$=4.5 mm, $l_{12}$=4 mm, $w_4$=1.1 mm, $w_5$=2 mm, $w_6$=0.3 mm, $w_7$=0.5 mm, r=1.6 mm, $r_1$=1.8 mm. r is the diameter of the metal connection column, and $r_1$ is the diameter of a hole provided on the metal sheet. The metal connection column passes through the hole to be fixed to the dielectric substrate 1, and the end of the metal connection column that passes through the hole is connected to a microstrip line, to realize coupling with an excitation signal.

Because slots are symmetrically provided on two sides of the ground metal plane 2 respectively in the planar inverted F antenna pair shown in FIG. 11, the impact of arranging the slot structure on the ground metal plane 2 will be analyzed below.

Figure 15:
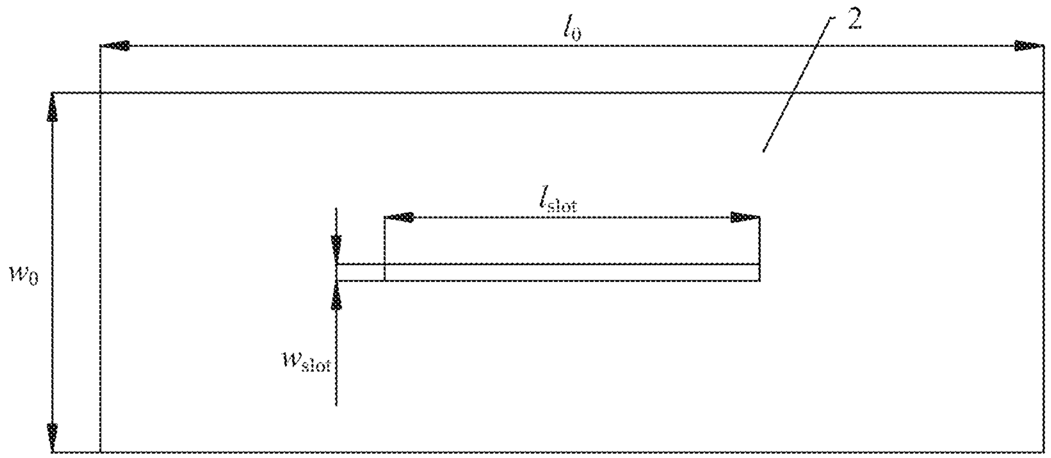
FIG. 15 is a slot decoupling structure according to an embodiment of this application.

FIG. 15 is a slot decoupling structure according to an embodiment of this application. As shown in FIG. 15, the structure includes a ground metal plane 2 and a dielectric substrate 1, and the ground metal plane 2 is arranged on the dielectric substrate 1. A slot is provided on the ground metal plane 2, and the slot generally has a rectangular structure. The length of the ground metal plane 2 is $l_0$, the width of the ground metal plane 2 is $w_0$, the length of the slot is $l_{slot}$, and the width of the slot is $w_{slot}$, where in a specific example, $l_{slot}$=24 mm, and $w_{slot}$=2 mm.

Figure 16:
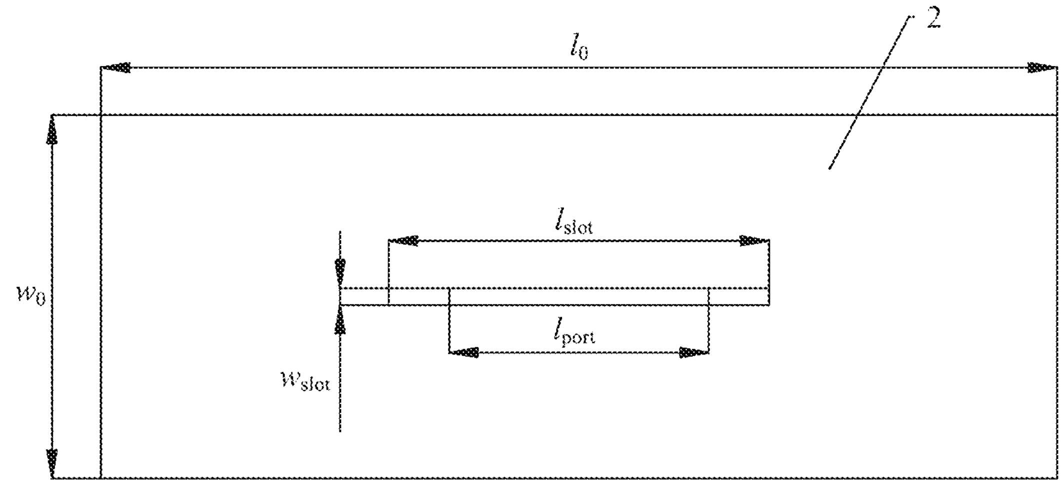
FIG. 16 is another slot structure according to an embodiment of this application.

In order to analyze the characteristics of the slot in the working frequency band when the slot shown in FIG. 15 is applied to a planar inverted F antenna pair, two ports are added to the slot shown in FIG. 15. FIG. 16 is another slot structure according to an embodiment of this application. As shown in FIG. 16, the ports are symmetrically loaded on the slot. It should be noted that the two ports are respectively kept at a certain distance from two ends of the slot. A distance between the two ports is $l_{port}$, where during performance analysis, the value of $l_{port}$ may be 7.5 mm. Performance analysis is performed on the slot structure shown in FIG. 16.

Figure 17:
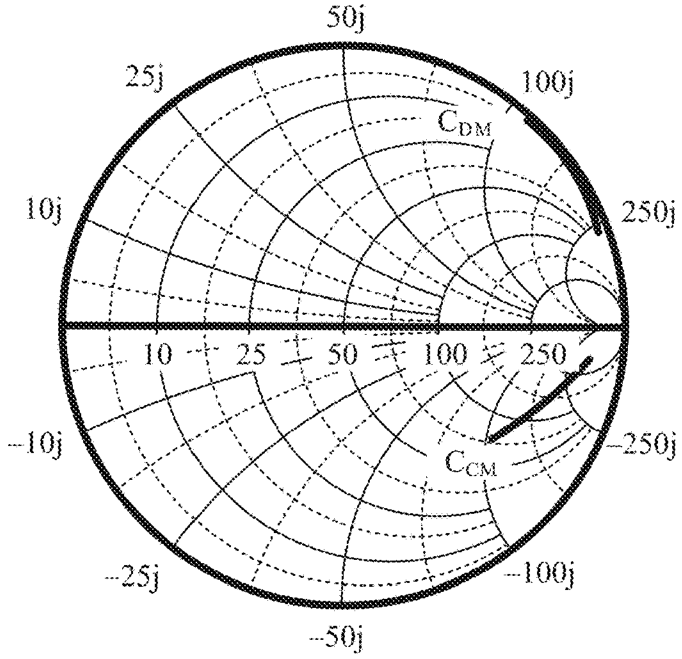
FIG. 17 is a Smith chart of impedances of the slot structure shown in FIG. 16 in a common mode and a differential mode within 5 to 7.5 GHz.

FIG. 17 is a Smith chart of impedances of the slot structure shown in FIG. 16 in a common mode and a differential mode within 5 to 7.5 GHz. As shown in FIG. 17, the curve $C_{CM}$ in FIG. 17 represents an impedance of the slot in the common mode, and the curve $C_{DM}$ in the figure represents an impedance of the slot in the differential mode. It can be seen from the curve $C_{CM}$ in the figure that the impedance of the slot in the common mode is good. It can be seen from the curve $C_{DM}$ in the figure that the impedance of the slot in the differential mode is almost pure reactance. Therefore, within the bandwidth of 5 to 7.5 GHz, in the differential mode, the slot is difficult to be effectively excited; and in the common mode, the slot can be excited. The structure in which the impedance in one of the modes is almost pure reactance shown in FIG. 17 is referred to as a single-mode structure, and the slot structure in the figure may be referred to as a single-mode slot.

In this embodiment of this application, in another planar inverted F antenna pair shown in FIG. 11, each of two sides of the antenna pair is provided with a slot structure, which is equivalent to loading the slot structure shown in FIG. 15 in the planar antenna pair shown in FIG. 4. The two slots in FIG. 11 are symmetrically provided with respect to the YZ plane, which is equivalent to loading the slot structure symmetrically on two sides of the planar inverted F antenna pair shown in FIG. 4. The planar inverted F antenna pair realizes excitation of the slots through coupling of the electric fields on two sides. For electric field intensity distribution diagrams of the two planar inverted F antennas, reference may be made to FIG. 7 and FIG. 8. The electric field generated by the two planar inverted F antennas is equivalent to an excitation source for each slot. Therefore, in the planar inverted F antenna pair shown in FIG. 11, an excitation manner of each slot corresponds to an excitation mode of the slot in FIG. 16. That is, the excitation for the slot by the electric field generated by the two planar inverted F antennas in FIG. 11 has the same principle with the excitation for the slot by the two ports in FIG. 16.

Simulation analysis is performed on the performance of the planar inverted F antenna pair shown in FIG. 11, and the size of the planar inverted F antenna pair may be set with reference to the description in the foregoing embodiments.

Figure 18:
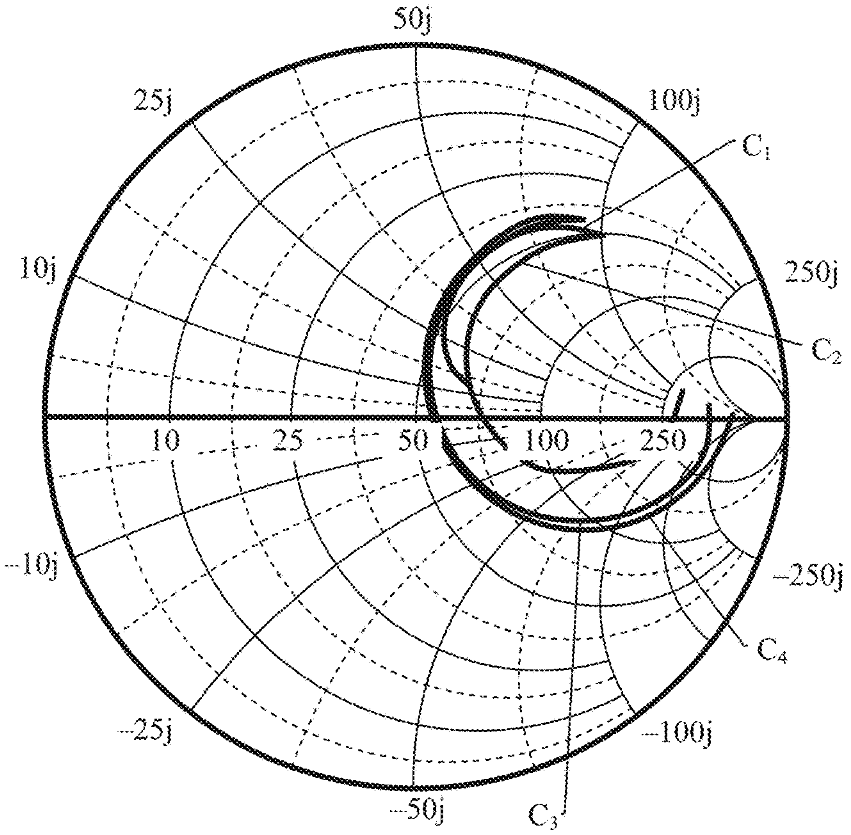
FIG. 18 is a Smith chart of impedances in two modes when the antenna pair shown in FIG. 4 is loaded with a single-mode slot or not within 5 to 7.5 GHz.

FIG. 18 is a Smith chart of impedances in two modes when the antenna pair shown in FIG. 4 is loaded with a single-mode slot or not within 5 to 7.5 GHz. As shown in FIG. 18, the curve $C_1$ in the figure represents the impedance in the common mode when no single-mode slot is loaded; the curve $C_2$ in the figure represents the impedance in the common mode when a single-mode slot is loaded; the curve $C_3$ in the figure represents the impedance in the differential mode when no single-mode slot is loaded; and the curve $C_4$ in the figure represents the impedance in the differential mode when a single-mode slot is loaded. By comparing the curve $C_1$ and the curve $C_2$, it can be seen that shapes and sizes of the curve $C_1$ and the curve $C_2$ are quite different, and the degree of coincidence between the two curves is relatively low, indicating whether to load the single-mode slot has relatively great influence on the impedance of the planar inverted F antenna pair in the common mode. By comparing the curve $C_3$ and the curve $C_4$, it can be seen that shapes and sizes between the curve $C_3$ and the curve $C_4$ have relatively small differences, and the two curves almost overlap together, and the degree of coincidence is relatively high, indicating whether to load the single-mode slot has very little influence on the impedance of the planar inverted F antenna pair in the differential mode, which may be ignored.

The loading of the single-mode slot has relatively great influence on the impedance of the planar inverted F antenna pair in the common mode, and has little influence on the impedance thereof in the differential mode. This phenomenon is determined by the impedance characteristics of the single-mode slot in the common mode and the differential mode, that is, when the single-mode slot is in the differential mode, the slot is difficult to be effectively excited; and when the single-mode slot is in the common mode, the slot can be excited.

Therefore, for the planar inverted F antenna pair shown in FIG. 11, by loading the single-mode slot structure in the planar inverted F antenna pair shown in FIG. 4, independent adjustment of the impedance of the back-to-back planar inverted F antenna pair in the common mode can be realized.

Figure 19:
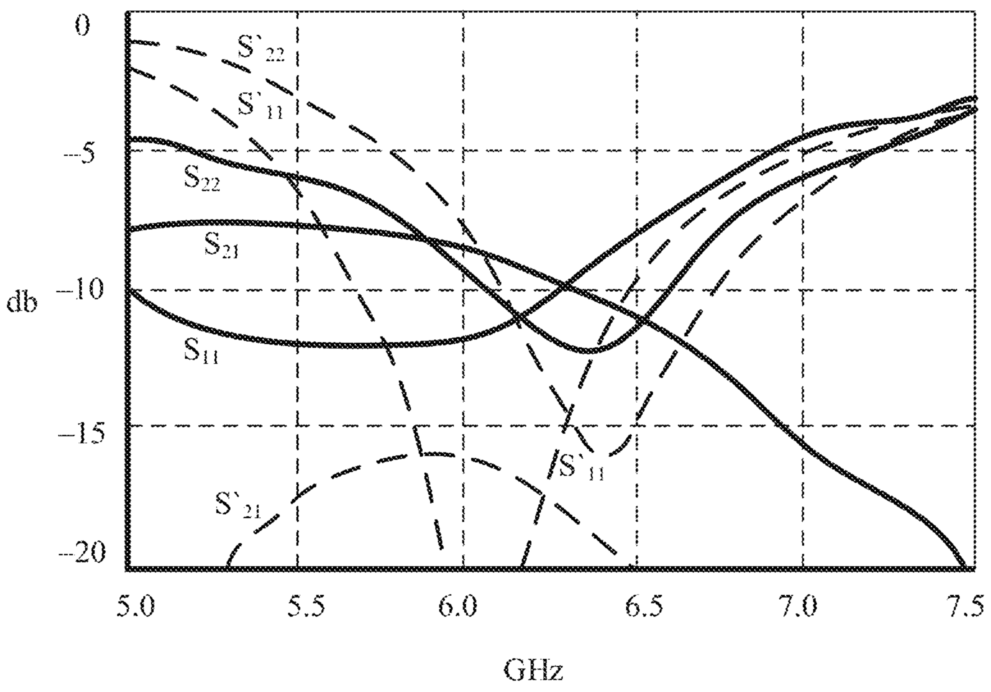
FIG. 19 is a simulated S parameter curve diagram within 5 to 7.5 GHz when the antenna pair shown in FIG. 4 is loaded with a single-mode slot or not.

FIG. 19 is a simulated S parameter curve diagram within 5 to 7.5 GHz when the antenna pair shown in FIG. 4 is loaded with a single-mode slot or not. As shown in FIG. 19, the curves $S_{11}$, $S_{21}$, and $S_{22}$ in the figure represent S parameters when no single-mode slot is loaded, and $S'_{11}$, $S'_{21}$, and $S'_{22}$ in the figure represent parameters when a single-mode slot is loaded. It can be seen from the curve $S_{21}$ in the figure that when no single-mode slot is loaded, the coupling degree of the two antennas is relatively low within 5 to 6.5 GHz, and the coupling degree is higher than −10 dB most of the time. It can be seen from the curve $S'_{21}$ in the figure that when a single-mode slot is loaded, within 5 to 7.5 GHz, the coupling degree of the two antennas is relatively high, and the coupling degree is always lower than −15 dB. It indicates that after the planar inverted F antenna pair is loaded with a single-mode slot (the antenna pair shown in FIG. 11), the coupling degree between the two antennas is relatively high, and the single-mode slot has a certain decoupling effect.

In order to further determine the influence of loading a single-mode slot on the antenna system, in this application, electric field intensity distribution diagrams of the planar inverted F antenna pair shown in FIG. 11 on an XY plane at which AA' is located in the two modes (the common mode and the differential mode) at 6 GHz are acquired through simulation analysis.

Figure 20:
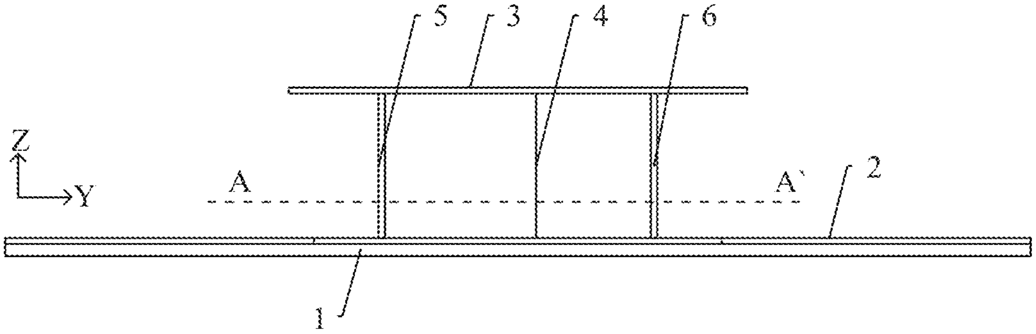
FIG. 20 is another schematic front view of the planar inverted F antenna pair shown in FIG. 11.
Figure 21:
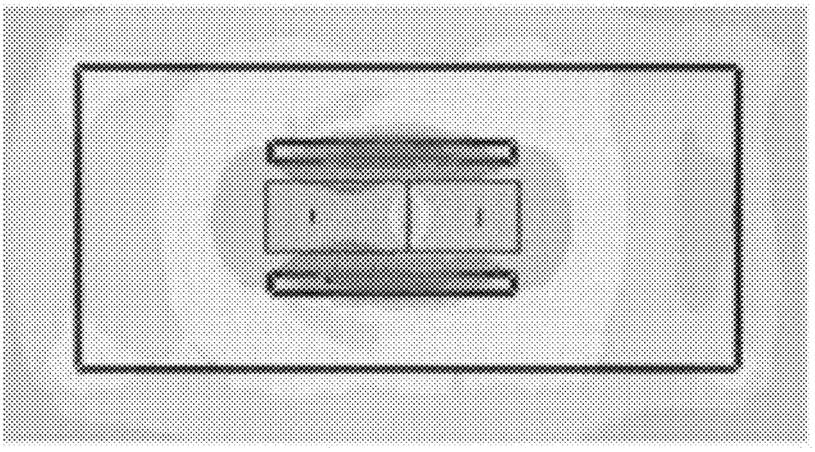
FIG. 21 is an electric field intensity distribution diagram of the planar inverted F antenna pair shown in FIG. 11 on an XY plane at which AA' is located in a common mode at 6 GHz.
Figure 22:
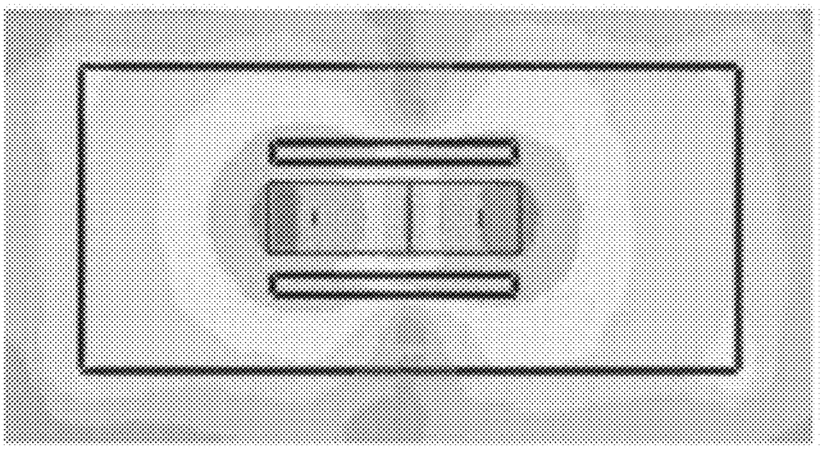
FIG. 22 is an electric field intensity distribution diagram of the planar inverted F antenna pair shown in FIG. 11 on an XY plane at which AA' is located in a differential mode at 6 GHz.

FIG. 20 is another schematic front view of the planar inverted F antenna pair shown in FIG. 11. Compared with FIG. 12, FIG. 20 shows a position of AA'. FIG. 21 is an electric field intensity distribution diagram of the planar inverted F antenna pair shown in FIG. 11 on an XY plane at which AA' is located in a common mode at 6 GHz; and FIG. 22 is an electric field intensity distribution diagram of the planar inverted F antenna pair shown in FIG. 11 on an XY plane at which AA' is located in a differential mode at 6 GHz. As shown in FIG. 21, in a common-mode case, the electric field intensity on the single-mode slot is high, and the single-mode slot is effectively excited. As shown in FIG. 22, in a differential-mode case, the electric field intensity on the single-mode slot is low; and the excitation effect of the single-mode slot is relatively poor, which may be considered as that the single-mode slot is difficult to be excited. Therefore, the loading of a single-mode slot will have influence on the impedance of the back-to-back planar inverted F antenna pair in the common mode. Conversely, in the differential mode, the single-mode slot cannot be effectively excited. It indicates that the influence of the loading of the single-mode slot on the common-mode impedance of the antenna system is effective.

In addition, in order to further analyze the influence on the performance of the planar inverted F antenna pair shown in FIG. 4 after the loading of the single-mode slot, simulation analysis is performed on the performance of the planar inverted F antenna pair after loading of a single-mode slot of a different length in this application. The planar inverted F antenna pair loaded with a single-mode slot is shown in FIG. 11, and the length of the single-mode slot is $l_{slot}$. In an example 1, the length $l_{slot}$ of the single-mode slot=22 mm; in an example 2, the length $l_{slot}$ of the single-mode slot=24 mm; and in an example 3, the length $l_{slot}$ of the single-mode slot=26 mm.

Figure 23:
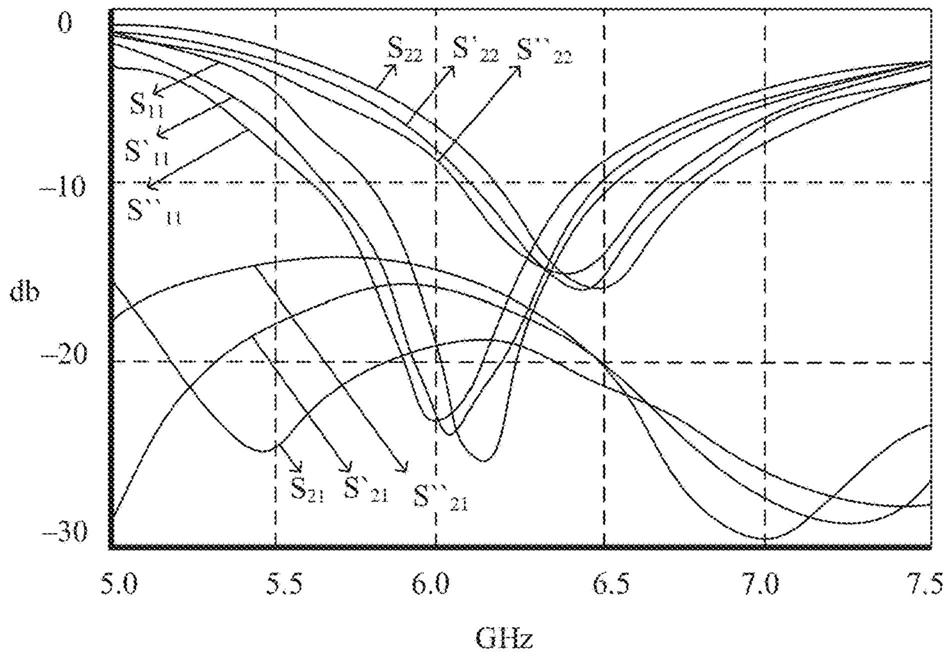
FIG. 23 is a simulated S parameter curve diagram of the planar inverted F antenna pair shown in FIG. 4 loaded with a single-mode slot of a different length.

FIG. 23 is a simulated S parameter curve diagram of the planar inverted F antenna pair shown in FIG. 4 loaded with a single-mode slot of a different length, and its bandwidth ranges from 5 to 7.5 GHz. As shown in FIG. 23, the curves $S_{11}$, $S_{21}$, and $S_{22}$ in the figure respectively represent situations of S parameters ($S_{11}$, $S_{21}$, and $S_{22}$) corresponding to the antenna pair when the length of the single-mode slot loaded on the planar inverted F antenna shown in FIG. 4 is 22 mm; the curves $S'_{11}$, $S'_{21}$, and $S'_{22}$ in the figure respectively represent situations of the S parameters ($S_{11}$, $S_{21}$, and $S_{22}$) corresponding to the antenna pair when the length of the single-mode slot loaded on the planar inverted F antenna shown in FIG. 4 is 24 mm; and the curves $S''_{11}$, $S''_{21}$, and $S''_{22}$ in the figure respectively represent situations of the S parameters ($S_{11}$, $S_{21}$, and $S_{22}$) corresponding to the antenna pair when the length of the single-mode slot loaded on the planar inverted F antenna shown in FIG. 4 is 26 mm. In the figure, the degree of coincidence of $S_{21}$, $S'_{21}$, and $S''_{21}$ is relatively low. When a single-mode slot of a different length is loaded, the corresponding $S_{21}$ parameter has a relatively great change, indicating that the loading of the single-mode slot has significant influence on the coupling of the two antennas in the planar inverted F antenna pair.

Figure 24:
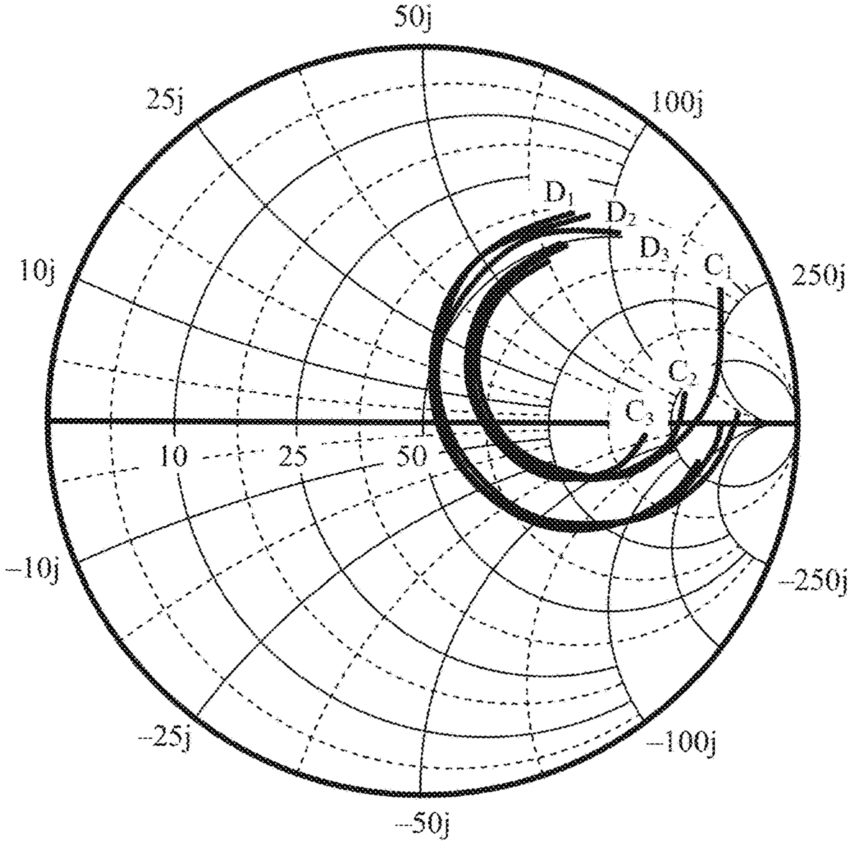
FIG. 24 is a Smith chart of impedances in two modes when the planar inverted F antenna pair shown in FIG. 4 is loaded with a single-mode slot of a different length.

FIG. 24 is a Smith chart of impedances in two modes when the planar inverted F antenna pair shown in FIG. 4 is loaded with a single-mode slot of a different length. As shown in FIG. 24, the curve $C_1$ in the figure represents the impedance of the antenna pair in the common mode when the length of the single-mode slot loaded on the planar inverted F antenna is 22 mm; the curve $C_2$ in the figure represents the impedance of the antenna pair in the common mode when the length of the single-mode slot loaded on the planar inverted F antenna is 24 mm; and the curve $C_3$ in the figure represents the impedance of the antenna pair in the common mode when the length of the single-mode slot loaded on the planar inverted F antenna is 26 mm. The curve $D_1$ in the figure indicates the impedance of the antenna pair in the differential mode when the length of the single-mode slot loaded on the planar inverted F antenna is 22 mm; the curve $D_2$ in the figure represents the impedance of the antenna pair in the differential mode when the length of the single-mode slot loaded on the planar inverted F antenna is 24 mm; and the curve $D_3$ in the figure represents the impedance of the antenna pair in the differential mode when the length of the single-mode slot loaded on the planar inverted F antenna is 26 mm. It can be seen that the degree of coincidence of the curve $C_1$, the curve $C_2$, and the curve $C_3$ is relatively low; and the degree of coincidence of the curve $D_1$, the curve $D_2$, and the curve $D_3$ is relatively high. It indicates that the loading of the single-mode slot of a different length has relatively great influence on the impedance of the planar inverted F antenna pair in the common mode, but has relatively little influence on the impedance of the planar inverted F antenna pair in the differential mode, which may be ignored.

Figure 25:
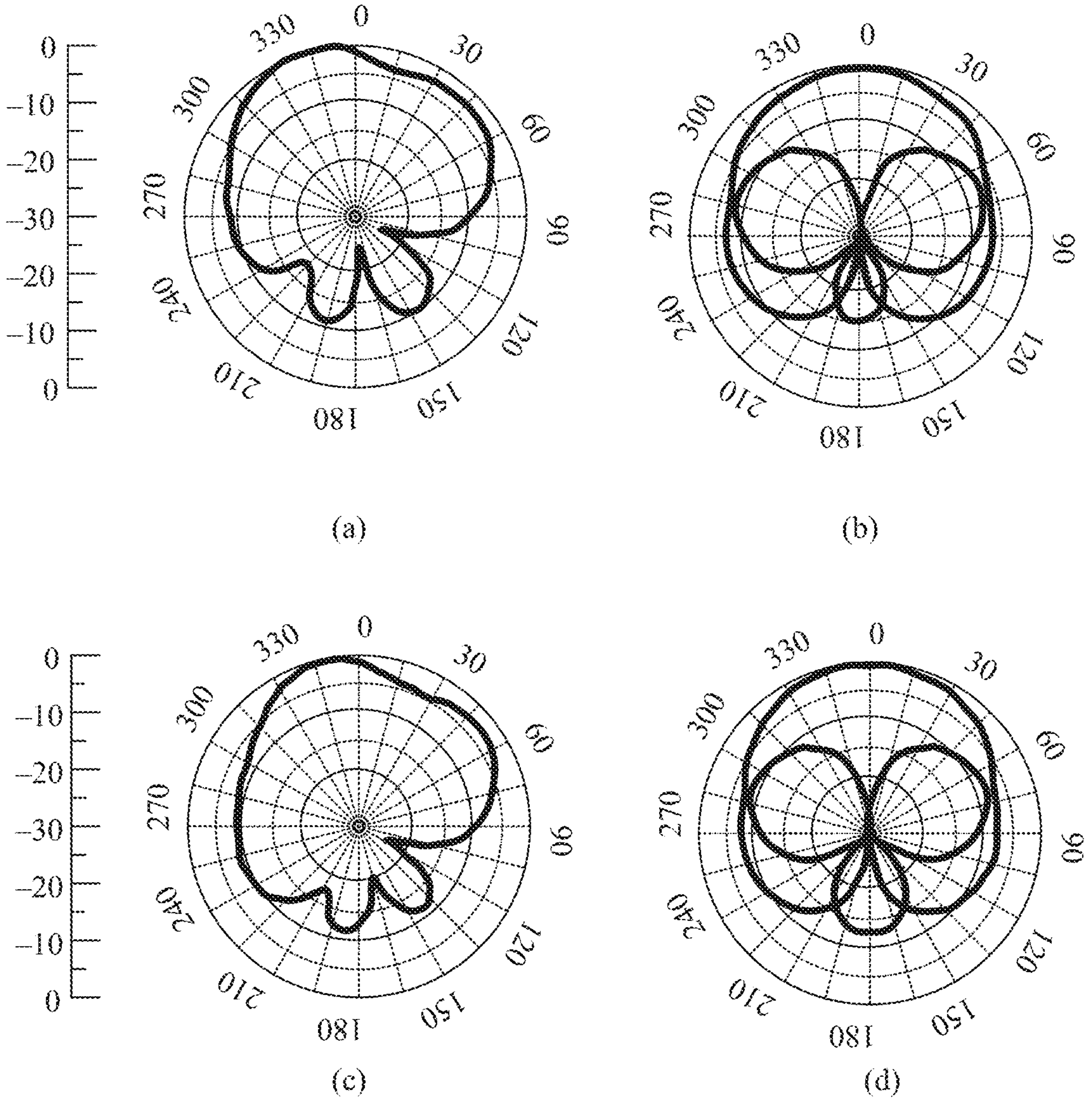
FIG. 25 is a radiation pattern of excitation of a first port in the planar inverted F antenna pair shown in FIG. 11 at different frequency points.

FIG. 25 is a radiation pattern of excitation of a first port in the planar inverted F antenna pair shown in FIG. 11 at different frequency points. (a) of FIG. 25 is an E-plane simulated radiation pattern of excitation of the first port at 5.3 GHz, and (b) of FIG. 25 is an H-plane simulated radiation pattern of excitation of the first port at 5.3 GHz. (c) of FIG. 25 is an E-plane simulated radiation pattern of excitation of the first port at 5.7 GHz, and (d) of FIG. 25 is an H-plane simulated radiation pattern of excitation of the first port at 5.7 GHz.

Figure 26:
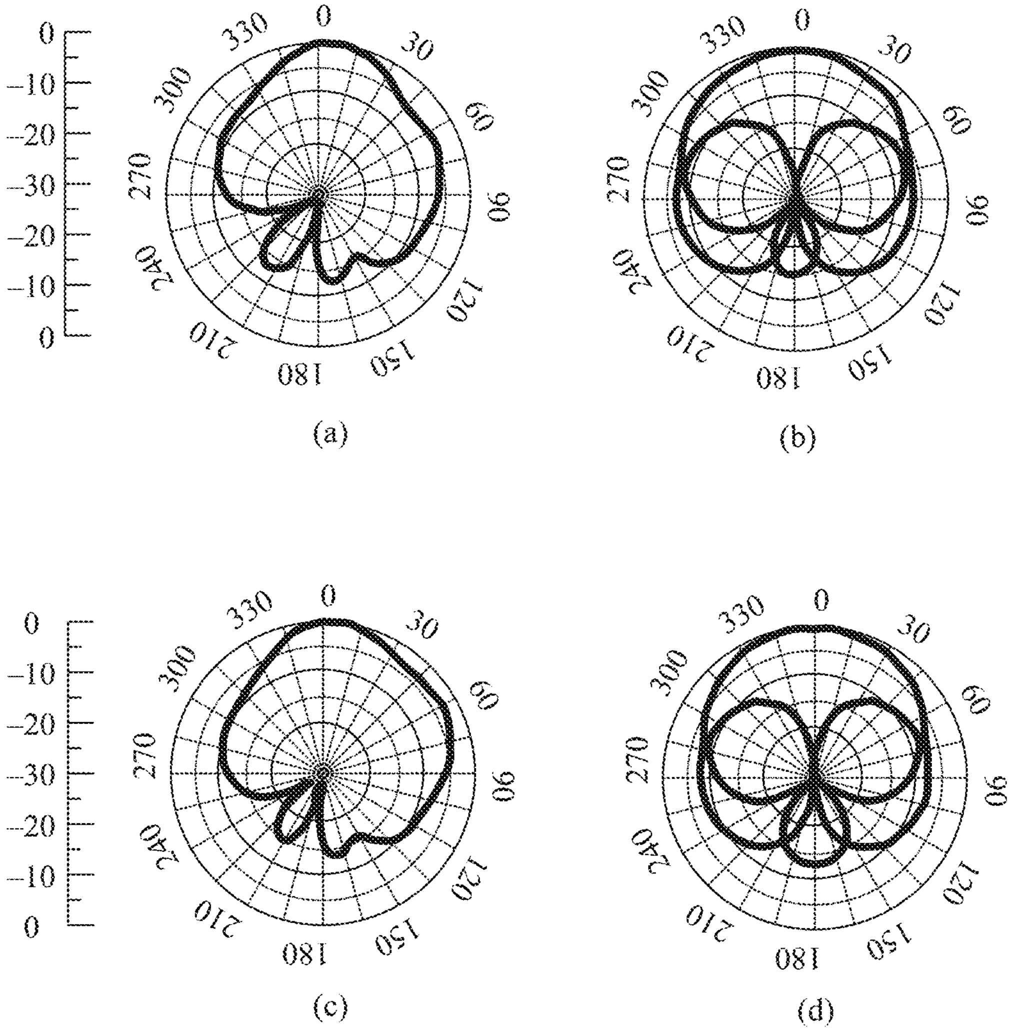
FIG. 26 is a radiation pattern of excitation of a second port in the planar inverted F antenna pair shown in FIG. 11 at different frequency points.

FIG. 26 is a radiation pattern of excitation of a second port in the planar inverted F antenna pair shown in FIG. 11 at different frequency points. (a) of FIG. 26 is an E-plane simulated radiation pattern of excitation of the second port at 6.3 GHz, and (b) of FIG. 26 is an H-plane simulated radiation pattern of excitation of the second port at 6.3 GHz. (c) of FIG. 26 is an E-plane simulated radiation pattern of excitation of the second port at 6.7 GHz, and (d) of FIG. 26 is an H-plane simulated radiation pattern of excitation of the second port at 6.7 GHz.

According to FIG. 25 and FIG. 26, it can be seen that the radiation patterns under the excitation of the two ports in the figures are both in a normal state, and no distortion or deterioration occurs, indicating that after a single-mode slot is loaded as a decoupling structure, the two planar inverted F antennas has relatively little mutual influence on the antenna radiation performance.

Figure 27:
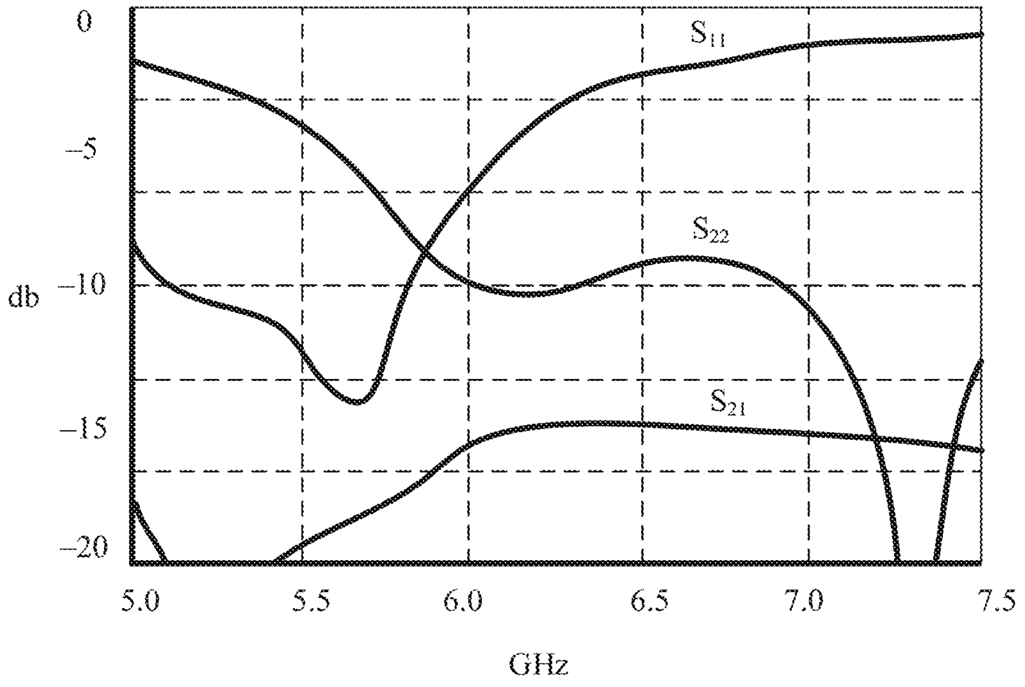
FIG. 27 is a simulated S parameter curve diagram of the planar inverted F antenna pair shown in FIG. 11 within 5 to 7.5 GHz.

FIG. 27 is a simulated S parameter curve diagram of the planar inverted F antenna pair shown in FIG. 11 within 5 to 7.5 GHz. The size parameter $l_{slot}$ of the antenna pair=24 mm, and for other parameters, refer to the descriptions in the foregoing embodiments. From the curve S21 in FIG. 27, it can be seen that within the range of 5 to 7.5 GHz, the degrees of isolation of the two ports is both lower than −20 dB, and the two ports cover the Wi-Fi 6 (5.15 GHz to 5.835 GHz) frequency band and the Wi-Fi 6E (5.925 GHz to 7.125 GHz) frequency band respectively.

Through the above analysis, it can be seen that after the single-mode slot decoupling structure is loaded, broadband decoupling of the back-to-back planar inverted F antenna pair can be realized. In addition, in order to realize that the two inverted F antennas work in different working frequency bands, the working frequency bands of the two planar inverted F antennas should be respectively matched. For a dual-antenna system, when the two antennas achieve high isolation degree within a considered frequency band, changing the working frequency band of each port will not deteriorate the coupling between the antennas.

In this embodiment of this application, the antennas used are a back-to-back planar inverted F antenna pair, and the antenna structure is relatively compact. During design of the decoupling structure, a common-mode and differential-mode impedance analysis method of the decoupling structure is used to select an appropriate decoupling structure. By loading single-mode slots, the back-to-back planar inverted F antenna pair (antennas shown in FIG. 11) loaded with two single-mode slots has broadband high-isolation characteristics, and the antennas in this application can work in continuous frequency bands. In this application, broadband decoupling between antennas is realized by loading of a single-mode slot. The single-mode slot has a simple structure, no complex decoupling structure and no optimization process are introduced, and no additional loss is introduced.

In this application, the antenna decoupling and port matching are realized separately, which is universal in design. The antenna pair in the foregoing embodiments supports the Wi-Fi 6 standard and the Wi-Fi 6E standard, but the antennas are not limited to working in this working frequency band. The decoupling structure (loading a single-mode slot structure to realize the decoupling of the antennas) in this application may also be applied to other antenna pairs supporting adjacent/continuous/same working frequency bands.

According to the description of the foregoing embodiments of this application, when an antenna pair works in adjacent/continuous/same working frequency bands, during design of realizing decoupling by loading a single-mode slot decoupling structure, the realization process may be performed according to the following steps: First, an initial size of the antenna system is determined based on a target frequency of the antenna pair. Subsequently, the impedance of the antenna pair in the differential mode and the impedance thereof in the common mode are analyzed. Based on the topology structure of the antenna pair, a possible loaded structure of the antenna pair is determined, for example, the loaded single-mode slot structure adopted in the foregoing embodiments. After the loaded structure is determined, impedances of the loaded structure in the differential mode and the common mode are analyzed to determine whether it is a single-mode structure. If the loaded structure is not a single-mode structure, replacement is performed with a new loaded structure based on the topology structure of the antenna pair until the loaded structure is a single-mode structure. When the loaded structure is a single-mode structure, the loaded structure is loaded into the antenna pair properly according to an excitation manner of the antenna pair, for example, a single-mode slot decoupling structure is loaded, and then parameters of the antenna pair and the single-mode slot structure are adjusted to realize broadband decoupling of the antenna pair; and finally, impedance matching is separately performed on the two ports of the antenna pair.

An embodiment of this application further provides an electronic device. The electronic device may include electronic products with antennas such as a mobile phone, a tablet computer (pad or tablet), a television, a smart wearable product (for example, a smart watch or a smart band), an internet of things (IOT), a virtual reality (VR) terminal device, an augmented reality (AR) terminal device, or an unmanned aerial vehicle. A specific form of the electronic device is not specially limited in this embodiment of this application. The electronic device includes the planar inverted F antenna pair described in the embodiment corresponding to FIG. 11. The antennas in the electronic device can realize decoupling through the single-mode slot structure loaded therein.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

The embodiments in this specification are all described in a progressive manner. Description of each of the embodiments focuses on differences from other embodiments, and reference may be made to each other for the same or similar parts among the embodiments.

Although exemplary embodiments of the embodiments of this application have been described, a person skilled in the art can make other changes and modifications to these embodiments once they know the basic creative concept. Therefore, the protection scope of this application covers the exemplary embodiments and all changes and modifications falling within the scope of the embodiments of this application.

The planar inverted F antenna pair and the electronic device provided in this application are described above in detail. Although the principles and implementations of this application are described by using specific examples in this specification, the descriptions of the foregoing embodiments are merely intended to help understand the method and the core idea of this application. In addition, a person of ordinary skill in the art may make modifications to the specific implementations and application range according to the idea of this application. In conclusion, the content of this specification is not to be construed as a limitation to this application.

The foregoing content is only specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A planar inverted F antenna pair, comprising:

a dielectric substrate;

a ground metal plane; and a radiation structure;

wherein the ground metal plane is arranged on a side of the dielectric substrate, and two ends of the radiation structure are respectively connected to a first feed portion and a second feed portion;

wherein the radiation structure is connected to the ground metal plane through a ground metal sheet, the ground metal sheet is located between the first feed portion and the second feed portion, and distances from the first feed portion and the second feed portion to the ground metal sheet are not equal; and wherein the ground metal plane is provided with a slot, two ends of the slot are located on two sides of the ground metal sheet, and the slot is provided along a direction in which the first feed portion and the second feed portion are arranged.

2. The planar inverted F antenna pair according to claim 1, wherein the ground metal plane is provided with two slots, the two slots are symmetrically arranged on two sides of the radiation structure, and the first feed portion and the second feed portion are located between the two slots.

3. The planar inverted F antenna pair according to claim 1, wherein both the first feed portion and the second feed portion are located on a center line of the radiation structure.

4. The planar inverted F antenna pair according to claim 1, wherein a working frequency band of one inverted F antenna of the planar inverted F antenna pair is from 5.15 GHz to 5.835 GHZ, and a working frequency band of the other inverted F antenna of the planar inverted F antenna pair is from 5.925 GHz to 7.125 GHz.

5. The planar inverted F antenna pair according to claim 4, wherein the ground metal plane and the radiation structure are rectangular, and the slot is also rectangular.

6. The planar inverted F antenna pair according to claim 5, wherein a length of the ground metal plane is 65 mm, a width of the ground metal plane is 30 mm, a length of the slot is 22 mm to 26 mm, and a width of the slot is 2 mm.

7. An electronic device, comprising:

a body; and a planar inverted F antenna pair, wherein the planar inverted F antenna pair is arranged inside the body;

wherein the planar inverted F antenna pair includes a dielectric substrate, a ground metal plane, and a radiation structure;

wherein the ground metal plane is arranged on a side of the dielectric substrate, and two ends of the radiation structure are respectively connected to a first feed portion and a second feed portion;

wherein the radiation structure is connected to the ground metal plane through a ground metal sheet, the ground metal sheet is located between the first feed portion and the second feed portion, and distances from the first feed portion and the second feed portion to the ground metal sheet are not equal; and wherein the ground metal plane is provided with a slot, two ends of the slot are located on two sides of the ground metal sheet, and the slot is provided along a direction in which the first feed portion and the second feed portion are arranged.

8. The electronic device according to claim 7, wherein the ground metal plane is provided with two slots, the two slots are symmetrically arranged on two sides of the radiation structure, and the first feed portion and the second feed portion are located between the two slots.

9. The electronic device according to claim 7, wherein both the first feed portion and the second feed portion are located on a center line of the radiation structure.

10. The electronic device according to claim 7, wherein a working frequency band of one inverted F antenna of the planar inverted F antenna pair is from 5.15 GHz to 5.835 GHz, and a working frequency band of the other inverted F antenna of the planar inverted F antenna pair is from 5.925 GHz to 7.125 GHz.

11. The electronic device according to claim 10, wherein the ground metal plane and the radiation structure are rectangular, and the slot is also rectangular.

12. The electronic device according to claim 11, wherein a length of the ground metal plane is 65 mm, a width of the ground metal plane is 30 mm, a length of the slot is 22 mm to 26 mm, and a width of the slot is 2 mm.

* * * * *